Figure 1:
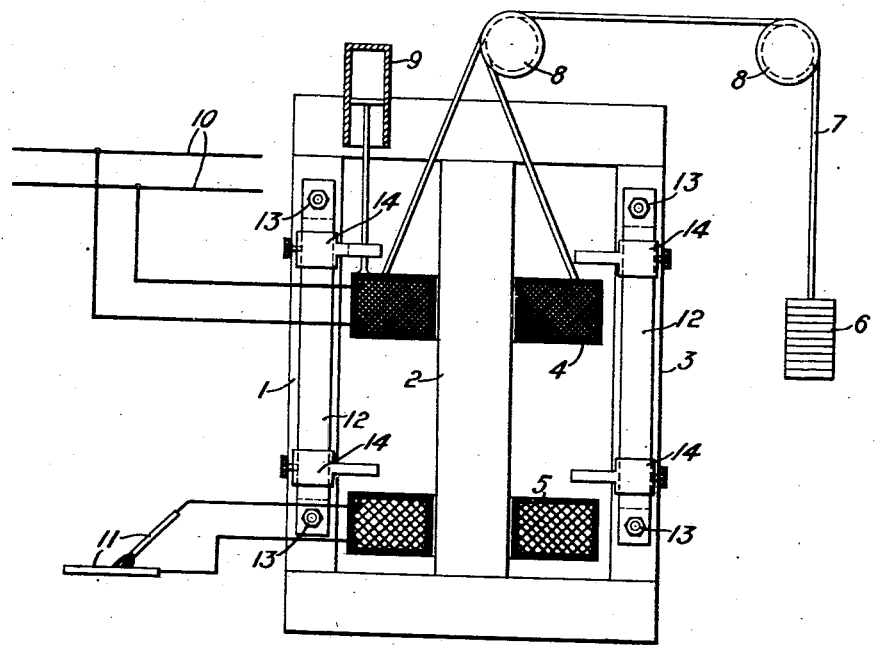

May 13, 1924.

O. H. ESCHHOLZ ET AL 1,493,849

ARC WELDING TRANSFORMER

Filed Sept. 25, 1919

WITNESSES:
H.T.Shelhamer
O.E.Bee.

INVENTORS
Otto H. Eschholz &
Albert M. Candy
BY
Wesley G. Carr
ATTORNEY

Patented May 13, 1924.

1,493,849

UNITED STATES PATENT OFFICE.

OTTO H. ESCHHOLZ AND ALBERT M. CANDY, OF WILKINSBURG, PENNSYLVANIA, ASSIGNORS TO WESTINGHOUSE ELECTRIC AND MANUFACTURING COMPANY, A CORPORATION OF PENNSYLVANIA.

ARC-WELDING TRANSFORMER.

Application filed September 25, 1919. Serial No. 326,324.

*To all whom it may concern:*

Be it known that we, OTTO H. ESCHHOLZ, a citizen of the United States, and a resident of Wilkinsburg, in the county of Allegheny and State of Pennsylvania, and ALBERT M. CANDY, a citizen of the United States, and a resident of Wilkinsburg, in the county of Allegheny and State of Pennsylvania, have invented a new and useful Improvement in Arc-Welding Transformers, of which the following is a specification.

Our invention relates to transformers and, more particularly, to transformers which may be incorporated in alternating-current-arc welding systems. The primary object of our invention is to provide transformers which may be employed in alternating-current welding systems which shall materially improve their starting characteristics.

It has been found that alternating-current welding systems possess certain desirable advantages over direct-current welding systems, but they also possess certain features which have prevented, to a certain extent, their general adoption. One of these difficulties resides in the arc-starting characteristics because it is difficult to establish an arc, by means of alternating current, on account of the reversals of the current which tend to create unstable conditions.

One object of our invention, therefore, resides in the provision of an alternating-current welding system possessing starting characteristics which shall permit of moderately skilled operators establishing and maintaining an arc.

Another object of our invention is to provide alternating-current welding systems by employing transformers of such design as to facilitate the arc-starting characteristics and, at the same time, to retain the inherent advantages of an alternating-current welding system; namely, those of portability and low cost of installation.

We have found that the starting characteristics of an alternating-current welding system may be materially improved if a plurality of current values are utilized. For example, a relatively heavy starting current is advantageous, in facilitating the establishing of an arc, because the work and the electrode are heated to such an extent that the arc is more readily drawn. Although a heavy starting current is an advantage in establishing an arc, a current of such value is undesirable, under operating conditions, because the metal may either be deposited at too great a rate upon the work or the latter may be melted through. It is desirable, therefore, to reduce the heavy starting current to an operating value which shall ensure strong and homogeneous welds.

A further object of our invention, therefore, resides in the provision of transformers which shall provide a relatively heavy starting current and automatically function to reduce the starting current to a satisfactory operating value.

With these and other objects in view, our invention will be more fully described, illustrated in the drawings, in the several views of which corresponding numerals indicate like parts, and then particularly pointed out in the claims.

Figure 2:
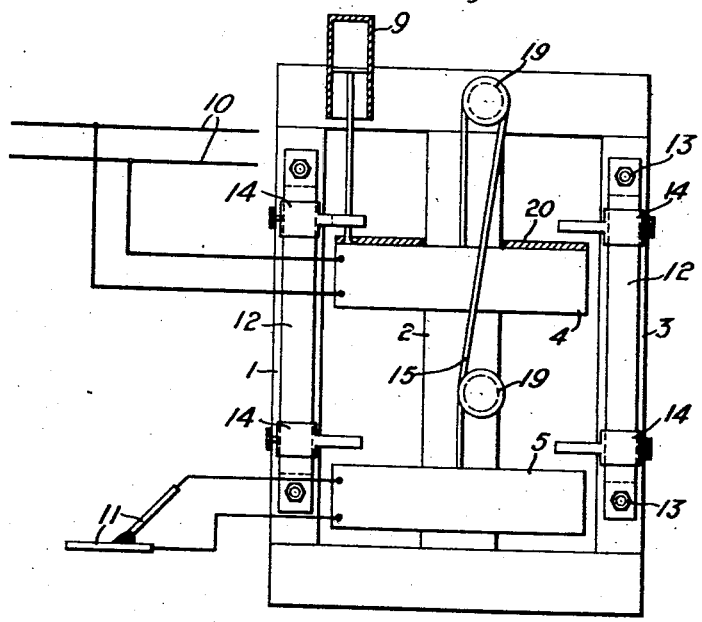

In the drawings, Fig. 1 is a diagrammatic view of a transformer incorporated in an alternating-current welding system, and Fig. 2 is a similar view illustrating a modification of our invention.

In practising our invention, we may employ a constant-current type of transformer in which the leakage reactance is somewhat exaggerated to provide stable characteristics in the welding circuit. A plurality of windings are adjustably mounted upon the core, and adjustable stops may be employed to regulate the value of the starting current, or the current which is drawn when the electrodes are short-circuited and to limit the value of the operating current to any predetermined value. The primary winding is, of course, connected to a suitable supply circuit, and the electrodes may be directly connected to the secondary winding to provide the welding circuit. A suitable retarding device may be employed to govern the lapse of time between the position initially taken by the movable winding and the position taken under operating conditions. The retarding device may be dispensed with but it is advantageous, in some instances, to permit the operator more time in establishing the arc, as will be more fully explained in the following description.

We may also employ a counterweight secured to the movable winding to make it more sensitive to changes of resistance in the welding circuit. In the illustrated modification of our invention, the primary and secondary windings are so mounted upon the core of the transformer as to be movable with respect to each other. This arrangement may be an advantage, in some instances, because the counterweight which is ordinarily connected to the movable winding, may be greatly reduced in weight or omitted. However, we have found it an advantage to employ a small counterweight because the windings need not be so accurately formed, with respect to the weight of material employed in each.

In Fig. 1 is shown a transformer comprising a core member having a plurality of legs 1, 2 and 3, upon the central leg 2 of which a primary winding 4 and a secondary winding 5 may be so mounted that the primary winding 4 is movable with respect to the secondary winding 5, which is preferably stationary. A suitable counterweight 6 may be secured to the primary winding 4 by a cable 7 supported by pulleys 8. The primary winding 4 may also be secured to a suitable retarding device 9 and connected to a suitable alternating-current supply circuit 10. The secondary winding 5 may be directly connected to a plurality of electrodes 11 to provide a welding circuit. A strip 12 may be mounted upon each of the outside legs 1 and 3 by bolts 13, which extend through the legs, and a plurality of stops 14 may be so mounted upon each of the strips 12 as to be adjustable to any position thereon.

In operating the above described welding system, two of the stops 14 are adjusted to a position, adjacent the secondary winding 5, to thus determine the position of the primary winding 4 with respect to the secondary winding. The primary winding 4 rests upon the stops 14, adjacent the secondary winding 5, when no current is being drawn between the electrodes 11, but, when the electrodes are short-circuited and a welding current is drawn, the primary winding 4 is repelled by the opposing magnetomotive force established by the secondary winding 5. It will be appreciated that the initial value of the current drawn between the electrodes depends upon the position the primary winding 4 initially assumes with respect to the secondary winding, and this position is regulated by proper adjustment of the stops 14. When the primary winding 4 is repelled by current being drawn through the secondary circuit, it moves along the leg 2 to a position limited by the upper stops 14, which are regulated to provide for a suitable operating current being drawn between the electrodes 11. The current in the secondary winding 5, of course, decreases, as the distance between the primary and secondary windings is increased, and the upper stops 14, therefore, may be adjusted to provide a suitable value of welding current.

The operating values of welding current may be different, depending upon the character of the work. For example, when relatively thick plates are to be welded, a relatively heavy current must be employed to obtain suitable penetration of the deposited metal and, when plates of less thickness are to be welded, a lower current value must be employed, in order to obviate the danger of melting through the plates and preventing a homogeneous weld. It will be appreciated, therefore, that it is highly desirable to provide means for regulating the value of welding current obtained, as well as to provide means for ensuring a suitable value in the starting current to improve the starting characteristics.

The retarding device 9 may be an advantage, in some instances, because it decreases the rate of movement of the primary winding 4 away from the secondary winding 5 and, therefore, permits of more time in establishing an arc and reaching stable conditions. Although the stops 14 have been shown as separably adjustable, each pair may be rigidly connected together in such manner that only one of the stops need be adjusted to provide a desirable starting current value and a subsequent lower operating value. Furthermore, while the stops have been shown as carried by a strip secured to the core member, a suitable frame work may be provided which is separable from the core member, if desired.

In Fig. 2 is shown a modification of our invention in which the primary winding 4 is mechanically connected to the secondary winding 5 by a suitable cable 15 which is passed over a plurality of pulleys 19. In this arrangement, the counterweight 6, shown in Fig. 1, is dispensed with because the windings are balanced by each other and are movable with respect to each other. In order to obviate the necessity of the correct weight being obtained in the manufacture of the windings, a suitable plate 20, which is recessed to fit about the central leg 2, may be disposed upon one of the windings to obtain a balance of weight between the windings. Several such plates may be employed when a material difference is found to exist between the windings.

The operation of the modified form of our invention is obvious from the description of the system shown in Fig. 1. The stops 14 are adjusted to regulate the initial distance between the primary winding 4 and the secondary winding 5 and, therefore, to regulate the value of the starting current drawn between the electrodes 11. The remaining, or upper, stops 14 are also regulated, in the manner before described, to limit the movement of the primary winding 4 away from the secondary winding 5 to obtain a suitable operating value of current. It will be appreciated, of course, that, when a current is drawn in the secondary circuit or between the electrodes 11, both windings tend to move away from each other, and the movement of the secondary winding 5 is restricted by the end of the core member while the movement of the primary winding 4 is limited by the stops.

Although we have shown, in Fig. 1, the secondary winding as being the stationary winding, it will be appreciated that the relative positions of the windings may be interchanged; that is, the primary winding 4 may be employed as a stationary winding and the secondary winding as the movable winding. However, we have found that the arrangement shown in Fig. 1 is more desirable, in most instances, because the conductors connecting the electrodes to the secondary winding are ordinarily more flexible than the conductors connecting the primary winding to the supply circuit.

Although we have shown and specifically described a plurality of transformers which may be incorporated in alternating-current welding systems, it is obvious that minor changes may be made in their construction and in the manner of employing them in a welding system, without departing from the spirit or scope of our invention, and we desire, therefore, that no limitations shall be imposed except such as are indicated in the appended claims.

We claim as our invention:—

1. An arc welding transformer comprising a core member, a plurality of windings mounted thereon, one of which is free to move with respect to the other, and adjustable stops for regulating the initial position of the movable winding and for limiting its range of movement.

2. An arc welding transformer comprising a core member, a plurality of windings mounted thereon, one of which is free to move with respect to the other, and adjustable stops mounted upon the core member for regulating the initial position of the movable winding and for limiting its range of movement.

3. An arc welding transformer comprising a core member having three legs, strips mounted upon the outer legs, primary and secondary windings disposed about the central leg, one of the windings being free to move with respect to the other and adjustable stops mounted upon the strips to regulate the initial position of the movable winding and to limit its range of movement.

4. An arc welding transformer comprising a core member having three legs, strips mounted upon the outer legs, primary and secondary windings disposed about the central leg, one of the windings being free to move with respect to the other, adjustable stops mounted upon the strips to regulate the initial position of the movable winding and to limit its range of movement, and a retarding device connected to the movable winding to regulate its rate of movement.

5. An arc welding transformer comprising a core member having three legs, strips mounted upon the outer legs, primary and secondary windings disposed about the central leg, one of the windings being free to move with respect to the other, adjustable stops mounted upon the strips to regulate the initial position of the movable winding and to limit its range of movement, a retarding device connected to the movable winding to regulate its rate of movement, and means connected to the movable winding for counterbalancing its weight.

In testimony whereof, we have hereunto subscribed our names this 2nd day of Sept., 1919.

OTTO H. ESCHHOLZ.
ALBERT M. CANDY.